(12) United States Patent
Huber

(10) Patent No.: US 12,196,234 B2
(45) Date of Patent: Jan. 14, 2025

(54) DYNAMIC SEAL ASSEMBLY WITH A VALVE AND A DIAPHRAGM FUNCTION

(71) Applicant: Schaeffler Technologies AG & Co. KG, Herzogenaurach (DE)

(72) Inventor: David Huber, Oppenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 15 days.

(21) Appl. No.: 18/265,670

(22) PCT Filed: Nov. 9, 2021

(86) PCT No.: PCT/DE2021/100891
§ 371 (c)(1),
(2) Date: Jun. 6, 2023

(87) PCT Pub. No.: WO2022/127970
PCT Pub. Date: Jun. 23, 2022

(65) Prior Publication Data
US 2024/0026907 A1    Jan. 25, 2024

(30) Foreign Application Priority Data

Dec. 15, 2020   (DE) ................... 10 2020 133 509.1

(51) Int. Cl.
*F15B 15/14*      (2006.01)
*F16J 15/16*      (2006.01)
(Continued)

(52) U.S. Cl.
CPC ......... *F15B 15/1452* (2013.01); *F16J 15/164* (2013.01); *F16J 15/3232* (2013.01);
(Continued)

(58) Field of Classification Search
CPC .. F15B 15/1452; F16J 15/164; F16J 15/3232; F16J 15/3268; F16J 15/3204
See application file for complete search history.

(56) References Cited

U.S. PATENT DOCUMENTS 4,289,264 A  *  9/1981  Rawlins .............. F16K 11/0712
                                                  277/447
5,328,178 A  *  7/1994  Nies ....................... F16J 15/164
                                                  277/552
(Continued)

FOREIGN PATENT DOCUMENTS

DE          2361755 A1      8/1974
DE          3823261         1/1990
(Continued)

*Primary Examiner* — Eugene G Byrd
*Assistant Examiner* — L. Susmitha Koneru

(57) ABSTRACT

A seal assembly includes a piston and a seal. The piston includes a first radial piston wall, a second radial piston wall extending radially further than the first radial piston wall, a groove formed between the first radial piston wall and the second radial piston wall, and a bypass line extending at least partially around the groove. The seal disposed in the groove. The seal includes a first sealing lip extending radially outward beyond the second radial piston wall and a second sealing lip. The second sealing lip is sealed against the first radial piston wall to seal an entry space when acted on by a pressure below a predetermined pressure limit pG, and pivotable radially inward to open the entry space when acted on by a pressure above the predetermined pressure limit pG.

17 Claims, 2 Drawing Sheets

(51) Int. Cl.
*F16J 15/3232* (2016.01)
*F16J 15/3268* (2016.01)
F16D 25/12 (2006.01)
F16H 61/30 (2006.01)
F16H 63/30 (2006.01)

(52) U.S. Cl.
CPC ........... *F16J 15/3268* (2013.01); *F16D 25/12* (2013.01); *F16D 2300/08* (2013.01); *F16H 61/30* (2013.01); *F16H 63/3023* (2013.01)

(56) References Cited

U.S. PATENT DOCUMENTS

| | | | |
|---|---|---|---|
| 6,129,358 A | 10/2000 | Kiesel et al. | |
| 8,407,996 B2 * | 4/2013 | Aoki | B60T 11/236 |
| | | | 60/588 |

FOREIGN PATENT DOCUMENTS

| | | |
|---|---|---|
| DE | 102007056651 A1 | 5/2009 |
| DE | 102013012044 A1 | 1/2015 |
| DE | 102016005035 A1 | 11/2017 |
| DE | 102017108030 A1 | 10/2018 |
| EP | 0276084 A2 | 7/1988 |

* cited by examiner

DYNAMIC SEAL ASSEMBLY WITH A VALVE AND A DIAPHRAGM FUNCTION

CROSS-REFERENCE TO RELATED APPLICATIONS

This application is the United States National Phase of PCT Appln. No. PCT/DE2021/100891 filed Nov. 9, 2021, which claims priority to German Application No. DE102020133509.1 filed Dec. 15, 2020, the entire disclosures of which are incorporated by reference herein.

TECHNICAL FIELD

The present disclosure relates to a seal assembly for a piston of a hydraulic system, for example, a piston of a hydraulic internal circuit of a transmission. Such a piston is pressurized by a fluid in order, for example, to actuate the shift forks of a transmission or also a disengaging bearing of a clutch. The present disclosure also relates to a disengaging system incorporating such a seal assembly.

BACKGROUND

DE 10 2013 012 044 A1 discloses a seal assembly which comprises a sealing ring having at least one first sealing lip which has at least one passage groove for the flow-conducting connection of two spaces to be sealed off from one another. The first sealing lip contacts a surface to be sealed of a machine element to be sealed under elastic pretensioning and is arranged on the face side of the sealing ring on a side of the sealing ring facing the first space to be sealed. A second sealing lip is arranged on the face side on the other side of the sealing ring on a second space to be sealed. The second sealing lip is designed as a valve lip for limiting a relative overpressure in the first space to be sealed compared to the second space to be sealed. At least one sealing bead is arranged in the axial direction between the first and the second sealing lip, which is assigned to the surface to be sealed in the unpressurized state of the seal assembly at a radial distance adjacent thereto.

The second sealing lip forms a static seal in the statically resting seal assembly. In the unpressurized state of the seal assembly, i.e., when there is practically no differential pressure between the spaces to be sealed against one another, the valve lip reliably seals the medium to be sealed against the surface to be sealed. As a result, the medium to be sealed cannot reach from the first space to be sealed through the passage groove into the second space to be sealed because this space is sealed by the valve lip. According to that prior art, a targeted, i.e., defined leakage can occur. Above a certain pressure, however, this known seal closes again.

Furthermore, DE 10 2017 108 030 A1 discloses a switching module of an automatic transmission which has a cylinder assembly of two cylinder components for disengaging two shift forks, which are arranged in axial alignment with one another and are connected to one another via a plastic intermediate piece. Each cylinder is equipped with a piston that is axially displaceable by means of hydraulic fluid. Each piston has a cylindrical basic shape with a radial sealing ring sealing the piston against an inner surface of the cylinder at the front ends thereof. However, with this type of seal, leakage can occur even at low pressures.

SUMMARY

The disclosure provides a seal assembly for a piston of a hydraulic system, for example, a piston of a hydraulic circuit of a transmission of a motor vehicle, which reliably fulfills a sealing function up to a predetermined limit pressure and a defined leakage flow from the predetermined limit pressure allows a hydraulic fluid and air to be vented.

One embodiment of a seal assembly includes a piston with a longitudinal axis L, which has at least two radial piston walls, a first and a second with respect to the longitudinal axis L, between which a groove is formed, and a seal received in the groove with a first sealing lip extending radially outward beyond the radial piston walls. The first radial piston wall extends less far radially outwards than the second radial piston wall, and that a second sealing lip sits sealingly against the first radial piston wall below a predetermined limit pressure pG acting thereupon and together therewith seals an entry space from which a bypass line within the piston at least partially extends around the groove. The second sealing lip pivots radially inwards at a pressure above the predetermined limit pressure pG, so that the entry space is opened.

With this seal assembly, two spaces in which different pressures prevail can be sealed against one another up to a limit pressure pG, since both sealing lips sit sealingly against the respective walls below the specified limit pressure. Above the limit pressure, the second sealing lip tilts inwards, i.e., into the interior of the groove, so that a passage is created between the second sealing lip and the first radial piston wall which allows hydraulic fluid and air to penetrate into the entry space and from there to flow into the bypass line. The bypass line may extend around the edge of the groove up to a region of the second radial piston wall, so that the fluid can flow outwards therefrom. As a result, a certain amount of fluid from the predetermined limit pressure pG circulates around the seal in the groove and a defined leakage occurs.

The limit pressure pG, above which the second sealing lip is pivoted or tilted, can be defined, for example, by the geometry of the second sealing lip and/or by a choice of material therefor. For example, the thinner the second sealing lip is and the longer it is, the lower the limit pressure from which it opens the entry space for the fluid. The situation is similar with the material: when selected, the softer it is and the more elastic it is, the lower the limit pressure PG.

On the other hand, a defined leakage flow, i.e., a flow rate per unit of time, which flows outwards via the bypass line when the limit pressure pG is exceeded, can be determined by the geometry of the bypass line. Determining factors therefor are, for example, the number of bypass lines, the width, and the depth of the bypass line or bypass lines. The greater the number and the greater the depth or width of the lines, the greater the defined leakage flow of the hydraulic fluid that escapes to the outside.

As mentioned above, the first radial piston wall extends less radially outward than the second radial piston wall. In this way there is a gap between the second radial piston wall and a housing which, when the seal assembly is used, surrounds it radially on the outside, through which gap hydraulic fluid can penetrate as far as the second radial piston wall. If the pressure of the hydraulic fluid is high enough, i.e., it exceeds the predetermined limit pressure pG, the second radial sealing lip pivots, as has already been mentioned, and allows access to the entry space and thus to the bypass line or bypass lines.

According to an example embodiment of the seal assembly, the first radial piston wall has a radially outer end which is flattened and the second radial piston wall has a radially outer end which is also flattened, with a radial distance between the radially outer ends of A>0. The larger the radial distance A, the more hydraulic fluid can penetrate up to the second sealing lip and act on the second sealing lip with regard to its opening or pivoting. The radial distance is also a means of determining the size of the leakage flow.

The radial distance A between the radially outer ends of the radial piston walls can be, for example, less than ⅓ of the radial extension of the groove. This means that the radial distance A is small compared to a depth of the groove and thus compared to a radial expansion of the radial piston walls. This ensures, among other things, that below the predetermined limit pressure pG, the seal assembly ensures adequate sealing in relation to the hydraulic fluid.

According to an example embodiment of the seal assembly, the bypass line extends from the entry space to the radially outer end of the second radial piston wall. The bypass line thus encircles the entire groove from the entry space to a region of the radially outer end of the second radial piston wall. When the seal assembly is in use, the second radial piston wall delimits the seal assembly to the outside, i.e., to the environment, which means that the leakage flow of the hydraulic fluid can escape to the outside in the region of the radially outer end of the second radial piston wall. This ensures a defined leakage above the limit pressure PG.

As far as the magnitude of the predetermined limit pressure pG is concerned, in practice this can be, for example, between 0.2 bar and 5 bar, inclusive. This means that if the pressure of a hydraulic fluid in a space or chamber, which is at least partially delimited in the axial direction by the first radial piston wall when the seal assembly according to the disclosure is used, rises above the stated value, the second sealing lip pivots and the hydraulic fluid penetrates into the entry space.

In the seal assembly according to the disclosure, the second sealing lip may be formed in one piece with the seal. In other words, the second sealing lip is an integral part of the seal in this embodiment. The tilting or pivoting of the second sealing lip above the predetermined limit pressure pG therefore takes place by bending or buckling the second sealing lip in relation to the rest of the seal, which may also be referred to below as the sealing body. According to an alternative, the second sealing lip could, for example, also be formed separately and be articulated on the sealing body via a connecting means.

According to an example embodiment, the piston is formed around the longitudinal axis L. This means that the seal assembly can be inserted into a cylindrical opening of a housing and can slide in the axial direction with respect to the longitudinal axis with respect to an inner wall of the housing to actuate a disengaging bearing or one or more disengaging forks or shift forks (in the case of an internal shifter) of a clutch. In other words, the seal assembly according to the disclosure is suitable in this case for forming part of a concentric slave cylinder or an internal transmission shift mechanism.

The bypass line of the seal assembly can extend from the entry space to a region between the second radial piston wall and the first sealing lip. This means that the bypass line still ends inside the groove of the seal assembly according to the disclosure. The leakage flow that occurs above the limit pressure thus flows into the region mentioned and can then pass between the second radial piston wall and a housing, against which the second radial piston wall is directed, and flow outwards. The first sealing lip seals the region in the axial direction, so that the hydraulic fluid cannot flow back in the direction of the first radial piston wall. According to an alternative embodiment, the bypass line or one of the bypass lines can also extend to an axial outer side of the second radial piston wall and thus direct the leakage flow directly to the outside.

As already mentioned, two or more bypass lines can also be present in the seal assembly according to the disclosure, e.g., to increase the leakage flow. The multiple bypass lines can have different geometries/dimensions and/or different courses to adapt the leakage flow to individual needs.

The present disclosure also relates to a disengaging system, which has a housing having a first space and a second space, which are delimited from one another in the axial direction by a seal assembly according to the embodiments described above. The piston of the seal assembly is mounted such that it can be displaced in the axial direction within the housing, and the first space is designed to be pressurized by a hydraulic fluid during operation. The seal assembly seals the first space, which during operation acts as a fluid space that is acted upon by hydraulic fluid for actuating the disengaging system from the second space, which can be opened to a clutch side. In this disengaging system, the first sealing lip sits against a wall of the housing. When hydraulic fluid is applied to the first space below the limit pressure pG, the piston slides inside the housing in the direction of the longitudinal axis L, with both sealing lips sealing off the first space from the second space. If the pressure of the hydraulic fluid exceeds the predetermined limit pressure pG, the second sealing lip opens by being pivoted into the entry space, whereas the first sealing lip continues to sit sealingly against the housing. In this way, only a specific, desired leakage flow can pass through the bypass line into the second space.

The seal assembly according to the disclosure and the disengaging system in which this seal assembly is received have an axially short design, so that the axial space requirement is small. In addition, the assembly of the seal assembly within the housing is simplified since there is only one radially sealing edge, which is formed by the first radial sealing lip. Finally, a defined leakage of the hydraulic fluid can be realized, which is more precise compared to an embodiment in which a leakage channel runs through the seal, i.e., the sealing body, since in comparison only small deformation influences act on a cross-section of the bypass line, whereas with a leakage channel through the seal, the elastomer material of the seal can influence the cross-section of the leakage channel.

BRIEF DESCRIPTION OF THE DRAWINGS

The disclosure is described below by way of a non-limiting example with reference to the drawing. In the drawing.

DETAILED DESCRIPTION

Figure 1:
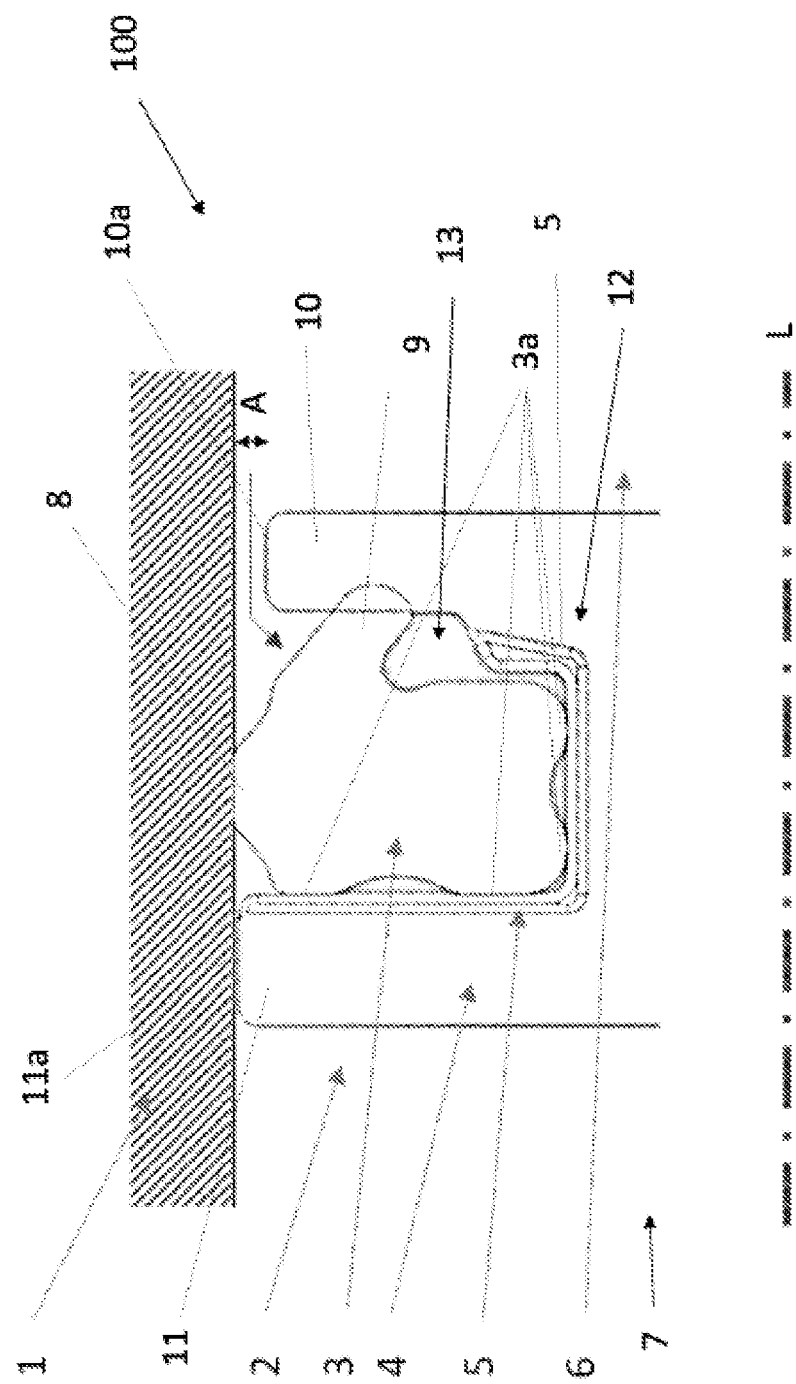
FIG. 1 shows an exemplary embodiment of a seal assembly in cross-section in a state at a pressure below a predetermined limit pressure pG.

FIG. 1 shows an embodiment of a seal assembly according to the disclosure in the longitudinal section. Reference symbol 1 shows a housing which encloses the seal assembly, which is indicated in its entirety by reference symbol 2, and delimits a hydraulic disengaging device 100. The seal assembly 2 is designed here to rotate symmetrically about its longitudinal axis L, with only one half of the seal assembly 2 being shown above the longitudinal axis L in the figure.

The seal assembly 2 includes a seal 3 and a piston 4 which can slide within the housing 1 in the axial direction with respect to the longitudinal axis L. The seal assembly 2 seals a first space 6 against a second space 7. For this purpose, the seal 3 includes projections 3a which are connected sealingly to the piston 4. In practice, hydraulic fluid is applied to the first space 6 to displace the piston 4 against the second space 7. In this way, the piston 4 can actuate a disengaging bearing or several disengaging forks or shift forks (not shown in the figure) to open or close a clutch or to engage or disengage a gear.

The seal 3 includes a first sealing lip 8 and a second sealing lip 9. As can be seen, the first sealing lip 8 sits against the housing 1 or an inner wall of the housing 1 and thus seals the two spaces 6, 7 from one another. The second sealing lip 9, which extends from the seal 3 against a first radial piston wall 10, is pretensioned against the first radial piston wall 10 and, at a pressure of the hydraulic fluid in the first chamber 6 below a predetermined limit pressure pG, causes no fluid to be able to penetrate into the second space 7.

As can be seen in the figure, the first radial piston wall 10 extends in the radial direction almost as far as the housing 1, giving rise to a slight distance A. This radial distance A enables the fluid to penetrate as far as the second sealing lip 9. A second radial piston wall 11 extends further in the radial direction than the first radial piston wall 10 toward the housing 1. In the embodiment shown, the first radial piston wall 10 has a radial end 10a which is flattened, while the second radial piston wall 11 has a radial end 11a which is also flattened. The radial distance A corresponds to the difference between the radial end 11a and the radial end 10a of the first radial piston wall 10.

The first radial piston wall 10 and the second radial piston wall 11 delimit a groove 12 of the piston 4, within which the seal 3 is fitted. As already mentioned, FIG. 1 shows a state according to which the pressure of a hydraulic fluid in the first chamber 6 is less than the predetermined limit pressure pG. In this state, the fluid or air can penetrate over the radial distance A into the groove 12, but only as far as the second sealing lip 9. Below the predetermined limit pressure pG, this seals an entry space 13 which is delimited by the seal 3, the second sealing lip 9 and the first radial piston wall 10. In this way, the fluid cannot penetrate as far as a bypass line 5 branching off from the entry space 13. As can be seen, the bypass line 13 in the embodiment shown extends inside the piston 4 around the groove 13 to a region of the upper radial end 11a of the second radial piston wall 11.

Figure 2:
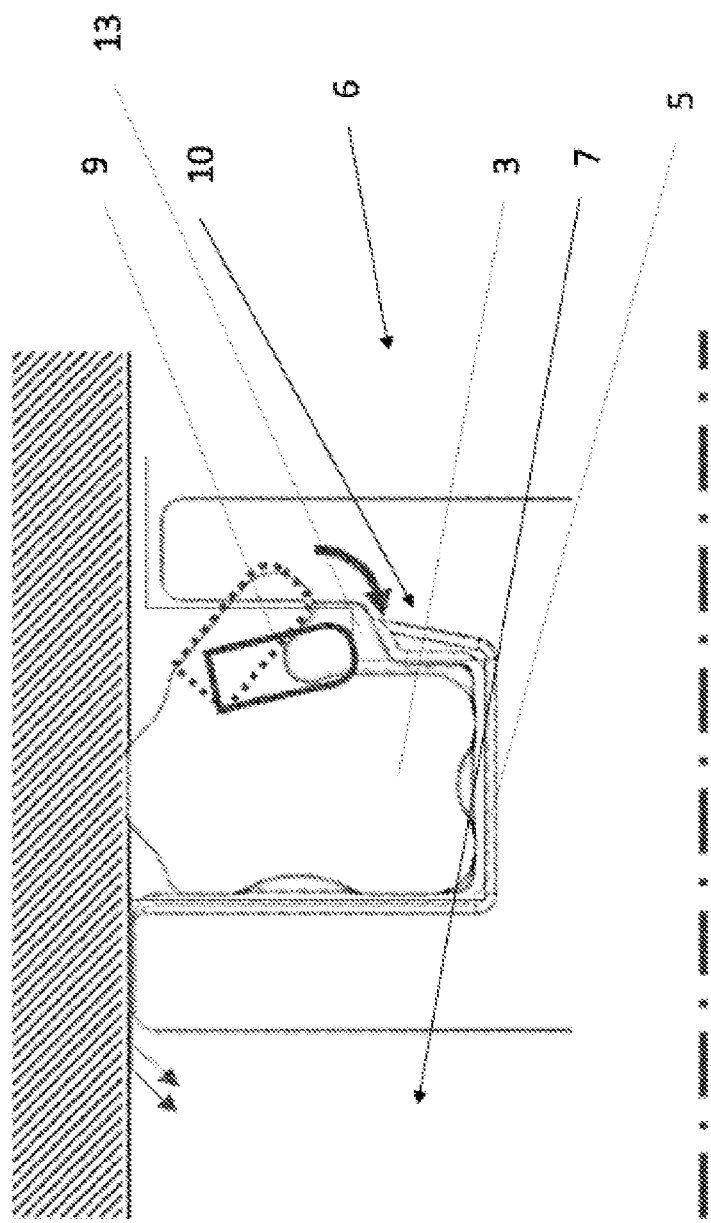
FIG. 2 shows the embodiment of FIG. 1 in a state at a pressure above the predetermined limit pressure pG.

Referring now to FIG. 2, the embodiment of the seal assembly 2 according to the disclosure is shown in a state in which the pressure of the hydraulic fluid in the first space 6 exceeds the predetermined limit pressure pG. In this state, the second sealing lip 9 pivots into the interior of the entry space 13, detaching itself from the first radial piston wall 10 and allowing hydraulic fluid to flow into the entry space 13, and from there on into the bypass line 5. As indicated by the two arrows at the top left of the figure, the fluid passes between the housing 1 and the second radial piston wall 11 into the second chamber 7. In this way, a defined leakage flow is made possible.

REFERENCE NUMERALS

1 Housing
2 Seal assembly
3 Seal
3a Projection
4 Piston
5 Bypass line
6 First space
7 Second space
8 First sealing lip
9 Second sealing lip
10 First radial piston wall
10a Radially outer end
11 Second radial piston wall
11a Radially outer end
12 Groove
13 Entry space
100 Hydraulic disengaging device

The invention claimed is:

1. A seal assembly, having:
a piston with a longitudinal axis L, which has at least two radial piston walls, a first and second in respect to the longitudinal axis L, between which a groove is formed, and
a seal received in the groove having a first sealing lip extending radially outward beyond the radial piston walls,
wherein the first radial piston wall extends less far radially outwards than the second radial piston wall by a radial distance A and a second sealing lip sealingly rests against the first radial piston wall below a predetermined limit pressure $p_G$ penetrating over the radial distance A into the groove and acting thereon, and together therewith seals an entry space, from which a bypass line within the piston extends at least partially around the groove, wherein the second sealing lip at a pressure above the predetermined limit pressure $p_G$ penetrating over the radial distance A into the groove pivots radially inward so that the entry space is opened.

2. The seal assembly according to claim 1, wherein the first radial piston wall has a radially outer end which is flattened and the second radial piston wall has a radially outer end which is flattened, wherein between the radially outer ends there is the radial distance of A>0.

3. The seal assembly according to claim 2, wherein the radial distance A is less than ⅓ of the radial extent of the groove.

4. The seal assembly according to claim 2, wherein the bypass line extends from the entry space to the radially outer end of the second radial piston wall.

5. The seal assembly according to claim 1, wherein the predetermined limit pressure $p_G$ is between 0.2 bar and 5 bar, inclusive.

6. The seal assembly according to claim 1, wherein the second sealing lip is formed in one piece with the seal.

7. The seal assembly according to claim 1, wherein the bypass line extends from the entry space to a region between the second radial piston wall and the first sealing lip.

8. The seal assembly according to claim 1, wherein there are two or more bypass lines.

9. A disengaging system, having a housing with a first space and a second space, which are delimited from one another in the axial direction by a seal assembly according to claim 1, the piston of the seal assembly being mounted displaceably in the axial direction within the housing and the first space being designed to be pressurized by a hydraulic fluid during operation.

10. A seal assembly, comprising:
a piston comprising:
a first radial piston wall;

a second radial piston wall extending radially further than the first radial piston wall by a radial distance A;

a groove formed between the first radial piston wall and the second radial piston wall; and a bypass line extending at least partially around the groove;

a seal disposed in the groove, the seal comprising:

a first sealing lip extending radially outward beyond the second radial piston wall; and a second sealing lip:

sealed against the first radial piston wall to seal an entry space when acted on by a pressure penetrating over the radial distance A and below a predetermined pressure limit $p_G$; and pivotable radially inward to open the entry space when acted on by a pressure penetrating over the radial distance A and above the predetermined pressure limit $p_G$.

11. The seal assembly of claim 10 wherein:

the first radial piston wall comprises a first flattened radially outer end;

the second radial piston wall comprises a second flattened radially outer end; and the radial distance A is measured between the first flattened radially outer end and the second flattened radially outer end.

12. The seal assembly according to claim 11 wherein:

the groove comprises a radial depth; and the radial distance A is less than one third (⅓) of the radial depth.

13. The seal assembly of claim 11 wherein the bypass line extends from the entry space to the second flattened radially outer end.

14. The seal assembly of claim 10 wherein the predetermined pressure limit $p_G$ is between 0.2 bar and 5 bar, inclusive.

15. The seal assembly of claim 10 wherein the second sealing lip is an integrally formed portion of the seal.

16. The seal assembly of claim 11 wherein the bypass line extends from the entry space to a region between the second radial piston wall and the first sealing lip.

17. The seal assembly of claim 11, further comprising two or more bypass lines.

* * * * *